(12) United States Patent
Rydelek

(10) Patent No.: US 6,738,573 B1
(45) Date of Patent: May 18, 2004

(54) CAMERA COWL ASSEMBLY

(75) Inventor: James G. Rydelek, Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/611,740

(22) Filed: Jul. 1, 2003

(51) Int. Cl.⁷ ................................................ G03B 5/00
(52) U.S. Cl. ...................... 396/72; 396/349; 396/535
(58) Field of Search ........................ 396/72, 349, 535; 359/694, 696, 823, 838

(56) References Cited

U.S. PATENT DOCUMENTS

| | | | |
|---|---|---|---|
| 4,199,248 A | 4/1980 | Schlapp et al. ............. | 396/531 |
| 4,302,077 A | 11/1981 | Sato et al. .................... | 359/828 |
| 4,307,954 A | 12/1981 | Ludwig ....................... | 396/531 |
| 4,478,492 A | 10/1984 | Ando ........................... | 359/828 |
| 5,225,939 A | 7/1993 | Iizuka ........................... | 359/811 |
| 5,707,897 A * | 1/1998 | Lee et al. ..................... | 438/257 |
| 5,974,264 A * | 10/1999 | Manabe et al. ................ | 396/6 |
| 6,058,274 A * | 5/2000 | Omiya .......................... | 396/535 |
| 6,282,374 B1 * | 8/2001 | Boyd et al. .................... | 396/6 |
| 6,349,003 B1 | 2/2002 | Ko ............................... | 359/694 |
| 6,392,828 B1 | 5/2002 | Nomura et al. ............. | 359/827 |

* cited by examiner

Primary Examiner—W. B. Perkey
(74) Attorney, Agent, or Firm—Robert Luke Walker

(57) ABSTRACT

A cowl assembly has a base and a twist ring mounted to the base. The twist ring defines an axis. The twist ring is rotatable relative to the base about the axis, between a primary orientation and a secondary orientation. A cover is removably attached to the base. A cowl is coupled to the cover. The cowl engages the twist ring. The cowl is pivotable with the twist ring between the primary and secondary orientations. The twist ring blocks the cowl from pivoting beyond the primary and secondary orientations to an over-travel orientation, in which the cowl is freely removable from the cover.

20 Claims, 16 Drawing Sheets

CAMERA COWL ASSEMBLY

FIELD OF THE INVENTION

The invention relates to cameras and photographic equipment and more particularly relates to a lens cowl mount and camera.

BACKGROUND OF THE INVENTION

Many cameras use interchangeable lenses that are attached to the camera body by a bayonet mount. To install an interchangeable lens using a typical bayonet mount, the lens is moved toward the camera body in a direction parallel to the optical axis until claws on the lens pass through matching slots adjoining a lens opening in the camera body. The lens is then rotated until it locks into place. This is quick and much more convenient than an alternative: screwing a lens onto a camera body having matching screw threads.

The claws of a bayonet mount typically have a shape that is complementary to the shape of the slots. Other claw and slot shapes can be provided to meet particular purposes, as disclosed in U.S. Pat. No. 4,199,248; U.S. Pat. No. 4,307,954; and European Patent Publication EP 0 788 021 A1. Examples of locking mechanisms that hold the lens in place after attachment, are disclosed in a U.S. Pat. Nos. 4,302,077 and 4,478,492. Many interchangeable lenses include a manual zoom feature, in which a zoom ring is rotated to change the focal length of the lens. The zoom ring is typically held on the rest of the lens unit by a fastener or is trapped by another part that is held on by a fastener or the like. See U.S. Pat. Nos. 5,255,939 and 6,349,003. Such attachment methods are effective, but tend to add parts and complexity to assembly procedures.

Mounts that hold interchangeable lenses have to provide for accurate positioning of the lenses. Zoom rings do not need such accurate positioning, but do need to be able to rotate relative to the rest of the lens units.

It would thus be desirable to provide camera and mount assemblies having the convenience and simplicity of a bayonet mount, but allowing rotation of one part relative to another.

SUMMARY OF THE INVENTION

The invention is defined by the claims. The invention, in broader aspects, provides a cowl assembly that has a base and a twist ring mounted to the base. The twist ring defines an axis. The twist ring is rotatable relative to the base about the axis, between a primary orientation and a secondary orientation. A cover is removably attached to the base. A cowl is coupled to the cover. The cowl engages the twist ring. The cowl is pivotable with the twist ring between the primary and secondary orientations. The twist ring blocks the cowl from pivoting beyond the primary and secondary orientations to an overtravel orientation, in which the cowl is freely removable from the cover.

It is an advantageous effect of the invention that improved camera and mount assemblies are provided that have the convenience and simplicity of a bayonet mount, but allow rotation of one part relative to another.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
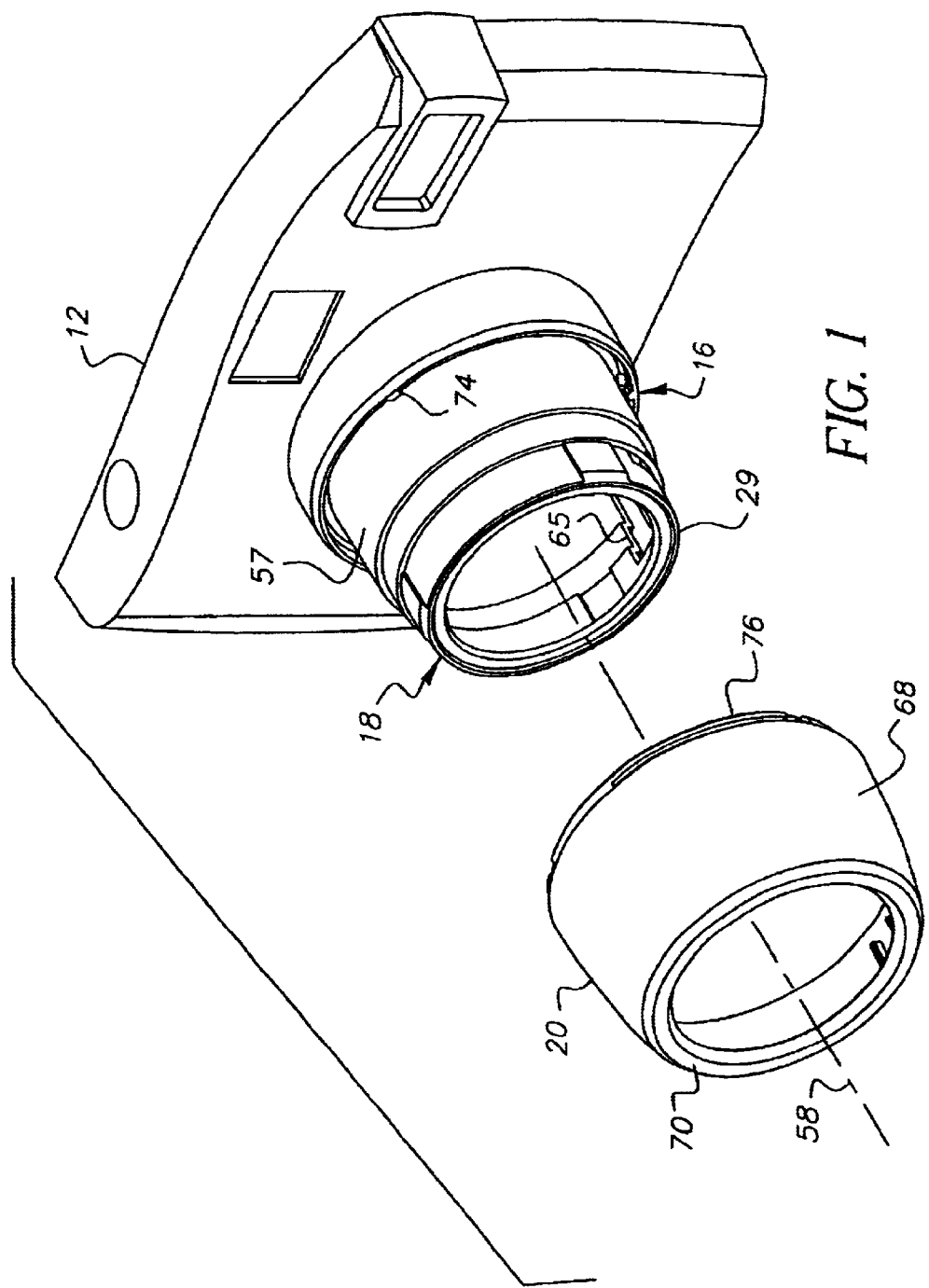
FIG. 1 is a partially exploded, front perspective view of an embodiment of the cowl assembly, including the cowl, cover, guide and band. For clarity, other components are not shown.

The term "cowl assembly" is used herein to refer to both a camera subassembly and to a completed camera and to similar portions of other optical devices such as binoculars. For example, the cowl assembly can be limited to a lens barrel and support structures for attachment to a camera body.

The cameras shown in the figures are one-time-use cameras, which expose images on photographic film. The invention is equally applicable to reusable film cameras and to one-time-use digital and reusable digital cameras. In the case of digital cameras, the film transport-shutter mechanism and related features, below discussed, are replaced by an electronic imager and control system and the images are stored to removable or nonremovable memory.

Referring to FIGS. 1–2 and 15–16, a camera 10 has a cover or front portion 12 that is joined to a rear closure 14. The manner in which the cover 12 and rear closure 14 are held together is not critical and can be by hooks or other fasteners (not shown); or adhesive or other bonding, or the like. The cover 12 has a lens opening 16 (best seen in FIG. 6). A lens module 18 is aligned with and, preferably, extends through the lens opening 16. The lens opening 16 is capped by an open-ended cowl 20. The cowl 20 and cover 12 can be made from multiple parts, but for simplicity and cost, it is preferred that each is a one-piece plastic casting.

In cameras 10, a frame assemblage 28 is located between the cover 12 and the rear closure 14. The frame assemblage 28 includes a camera frame 36 that provides a pair of film chambers 38,40 and an exposure frame (not shown) between the chambers 38,40. The frame assemblage 28 also includes a baffle 42 that directs light through the exposure frame to the film (not shown). The lens module 18 is joined to the camera frame 36 and telescopes relative to a base 24. In the embodiments shown in the figures, the lens module 18 includes a holder 26 and a barrel 22. The base 24, in these cameras 10, includes the holder 26, camera frame 36, and baffle 42. The base 24 can, alternatively, be limited to a holder 26 (not separately illustrated).

The holder 26 and camera frame 36 can be two or more pieces joined together or can be different portions of a a one-piece component. In the illustrated embodiment, the holder 26 has a support 27 that is hooked onto the camera frame 36 and a guide 29 that is joined onto and extends outward from the support 27.

Other features of the one-time-use cameras 10 are like those of other one-time-use cameras. A film transport-shutter mechanism 44 that has a thumbwheel 46 and shutter button 48, is joined to the camera frame 36. A flash unit 50 is joined to the camera frame 36. The camera frame 36 also holds a battery 51 for the flash unit 50. The frame assemblage 28 also provides a viewfinder 52. The viewfinder 52 can have a fixed focal length, but a viewfinder that zooms in the same manner as the lens unit is preferred. Such viewfinders and ways of linking such viewfinders to lens module units are well known to those of skill in the art.

Figure 2:
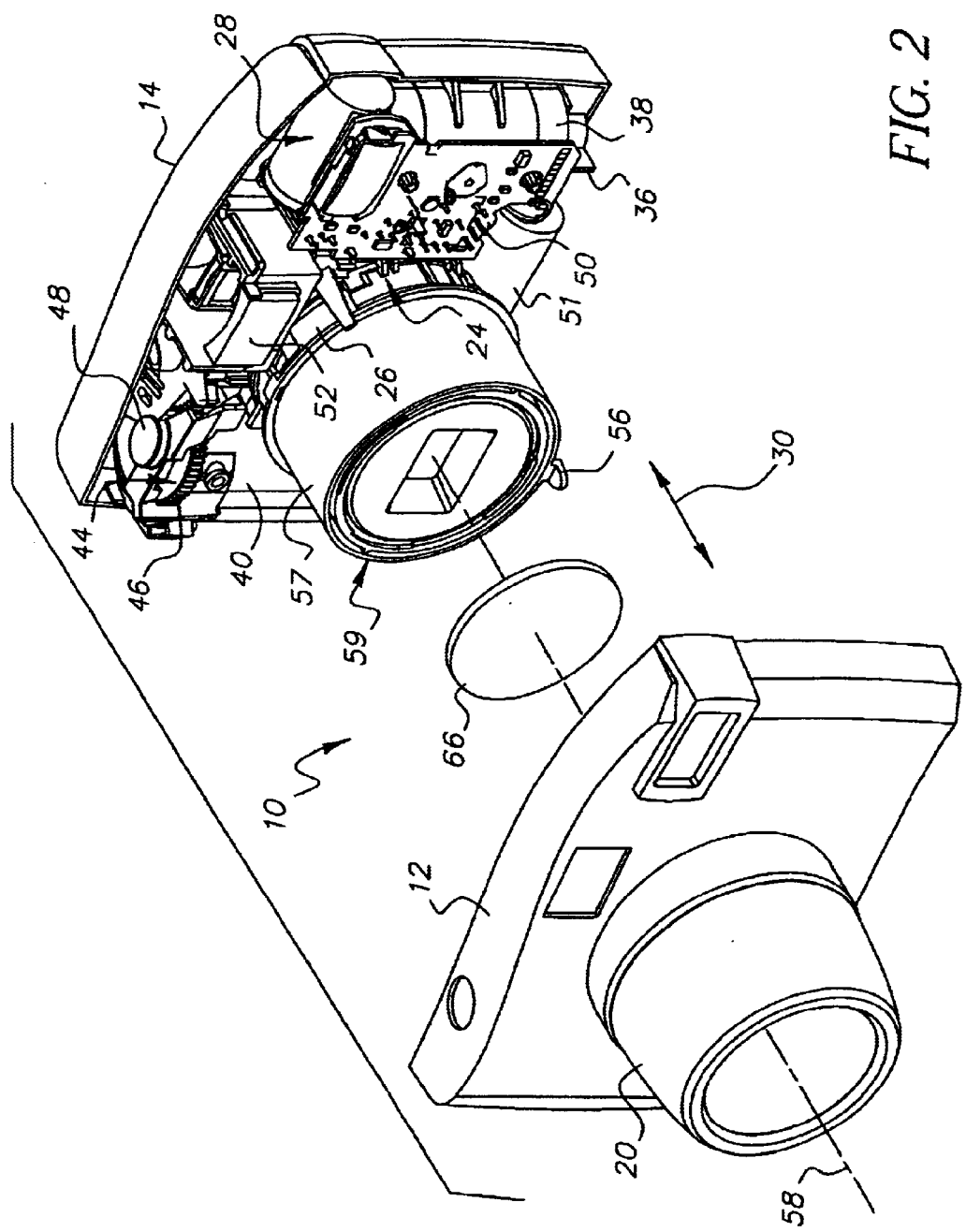
FIG. 2 is a partially exploded view of a camera that includes the cowl assembly of FIG. 1. For clarity, some parts are not shown.

A barrel 22 of the lens module 18 is movable between an extended position and a retracted position relative to the base 24. The movement of the barrel 22 of the lens module 18 is along an optical axis 58 defined by the base 24, as indicated in FIG. 2 by arrow 30. In the embodiments shown in FIGS. 1 and 6, when the barrel 22 moves between the extended and retracted positions, the entire barrel 22 remains within the holder 26 and cowl 20. In another embodiment shown in FIGS. 12–13 the barrel 22 moves in and out of the holder 26 and cowl 20, when moving between the extended and retracted positions.

Telescoping lenses are well-known to those of skill in the art and are generally used to provide zoom, that is, to vary the focal length. In such lenses, the movable barrel 22 and the holder 26 of the lens module 18 can be assemblies of a large number of parts. For example, many zoom lenses have a barrel that moves two sets of optical elements, with one set moving at different rates than the other set.

Figure 6:
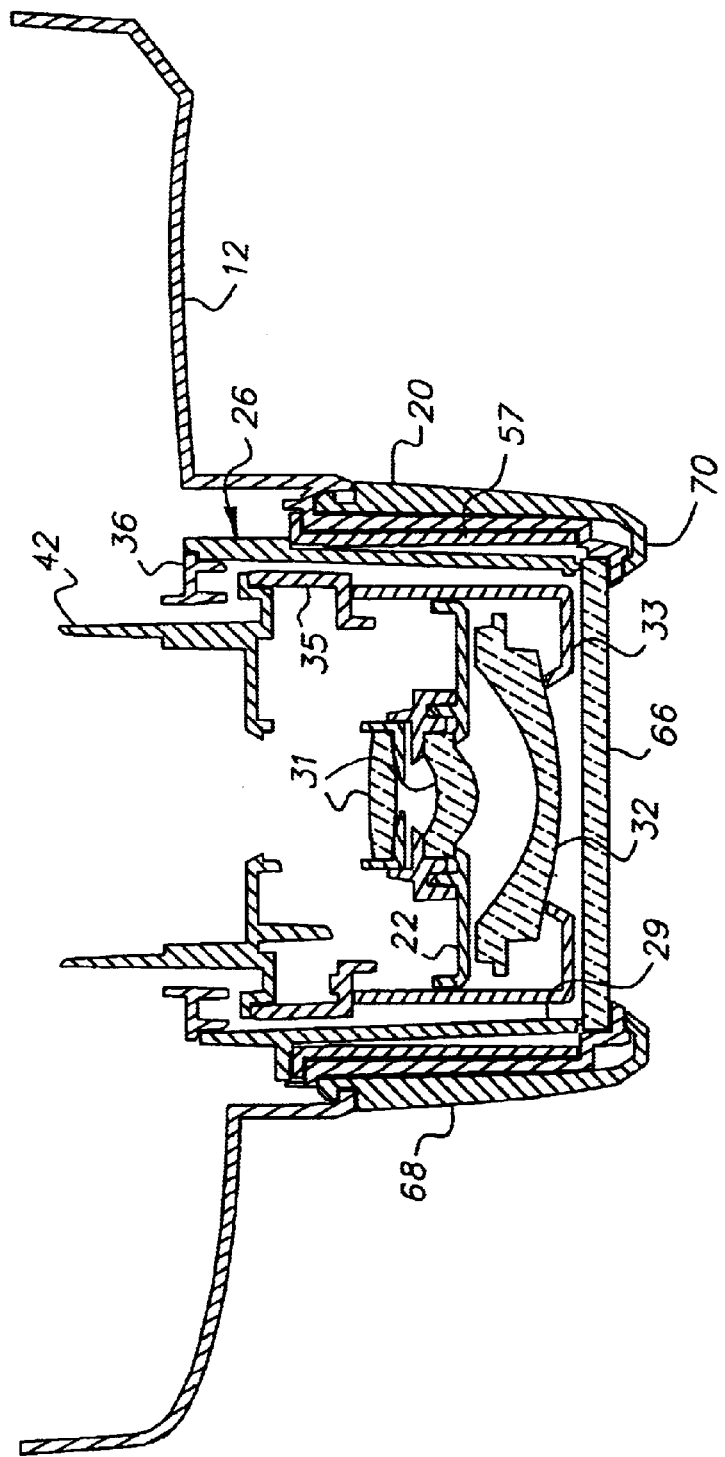
FIG. 6 is a cross-sectional view of a modification of the camera of FIG. 2 taken substantially along line 6—6 of FIG. 16. For clarity, only the front cover, cowl, and barrel are shown. The barrel is in the extended position.
Figure 7:
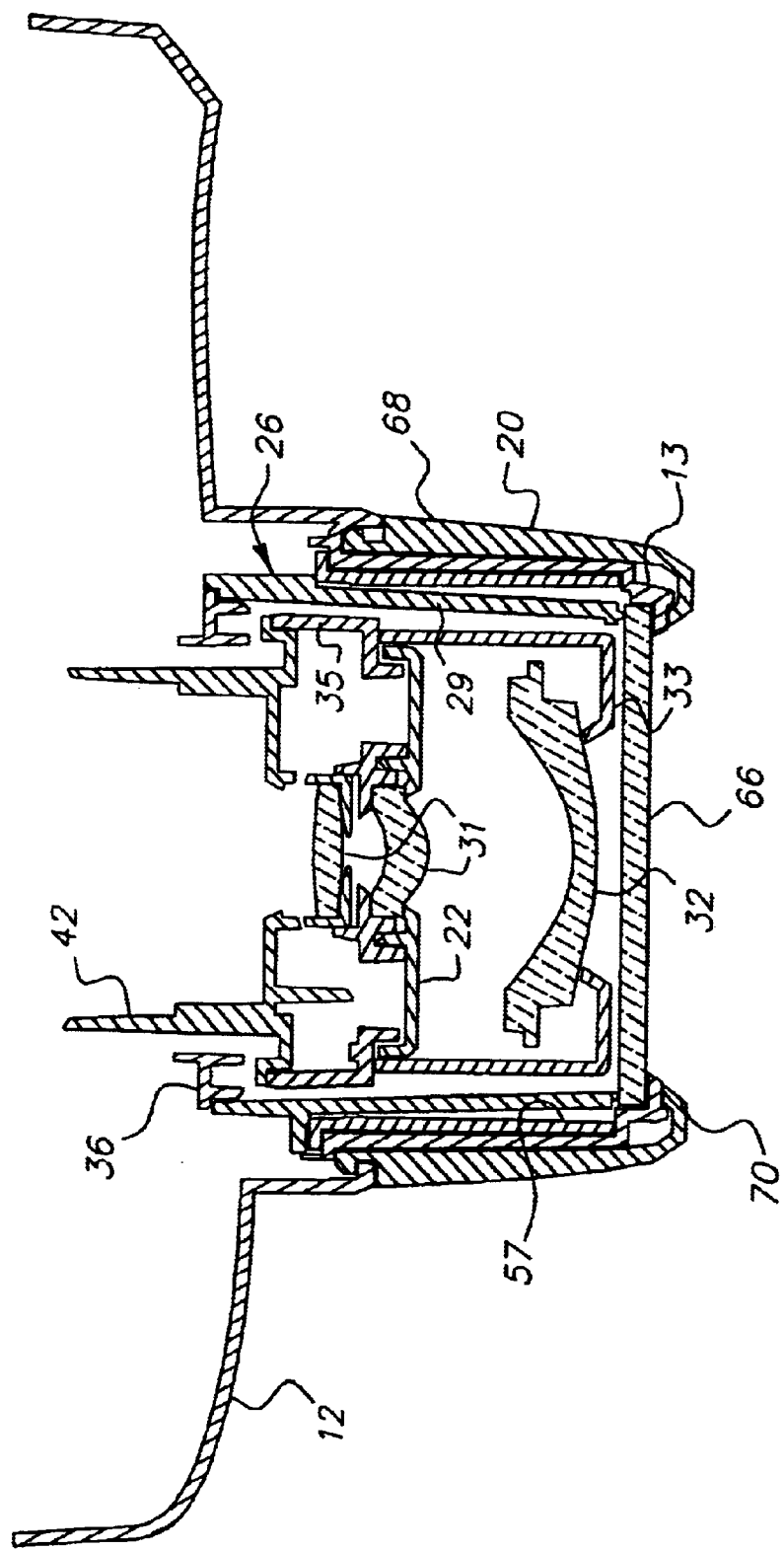
FIG. 7 is the same view as FIG. 6, but the barrel is shown in the retracted position.
Figure 8:
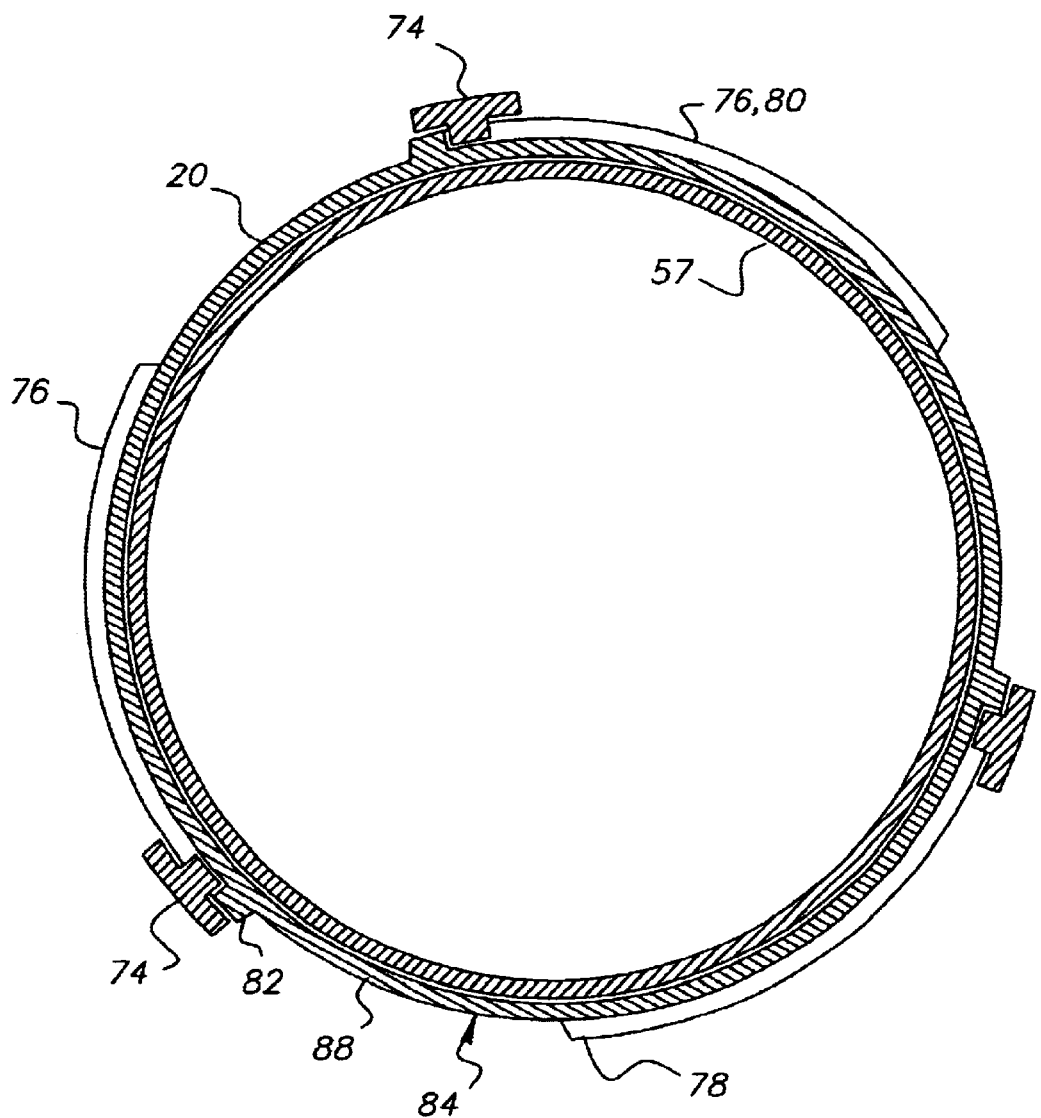
FIG. 8 is a cross-sectional view of the camera of FIG. 2 taken substantially along a line 8—8 of FIG. 16. For clarity, only the circumferential wall of the barrel is shown. The cowl is shown in an orientation in the first range.
Figure 9:
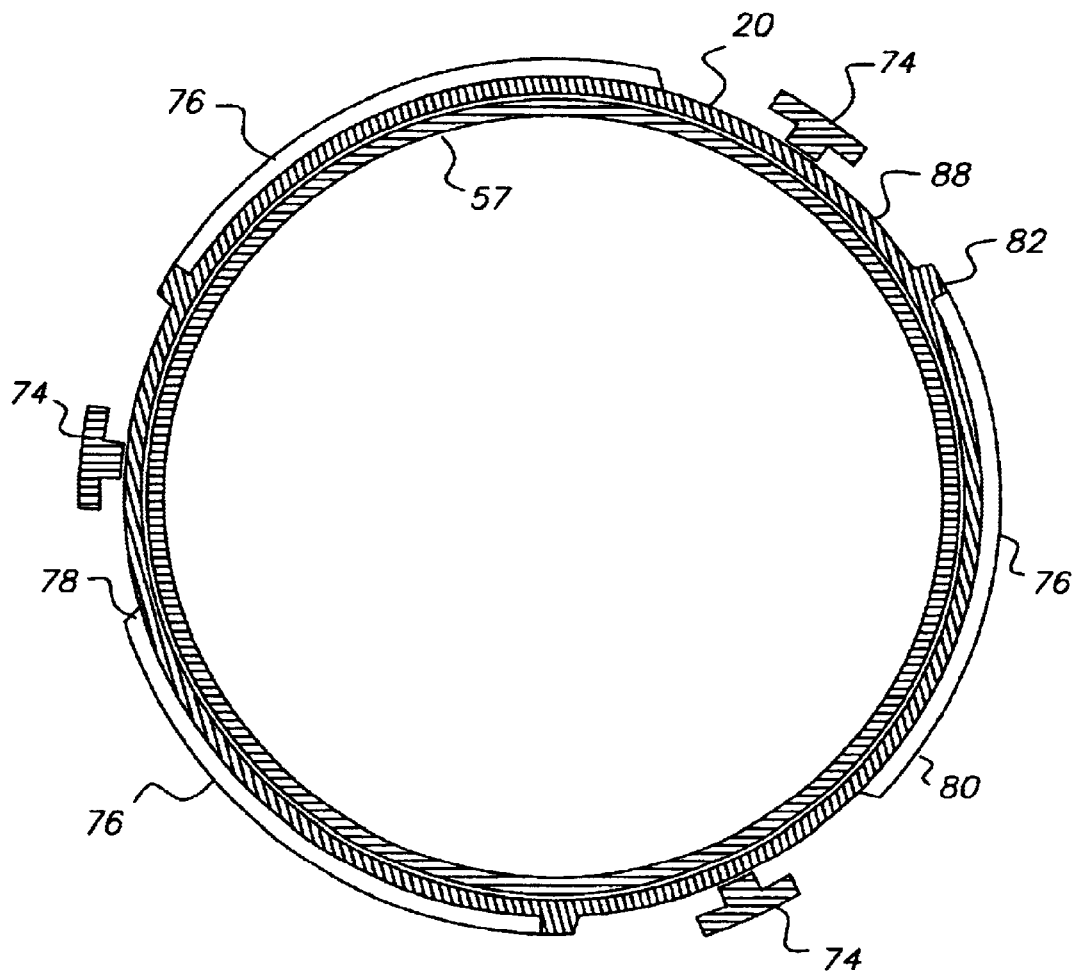
FIG. 9 is the same view as FIG. 8, but the cowl is shown in an orientation in the second range.
Figure 10:
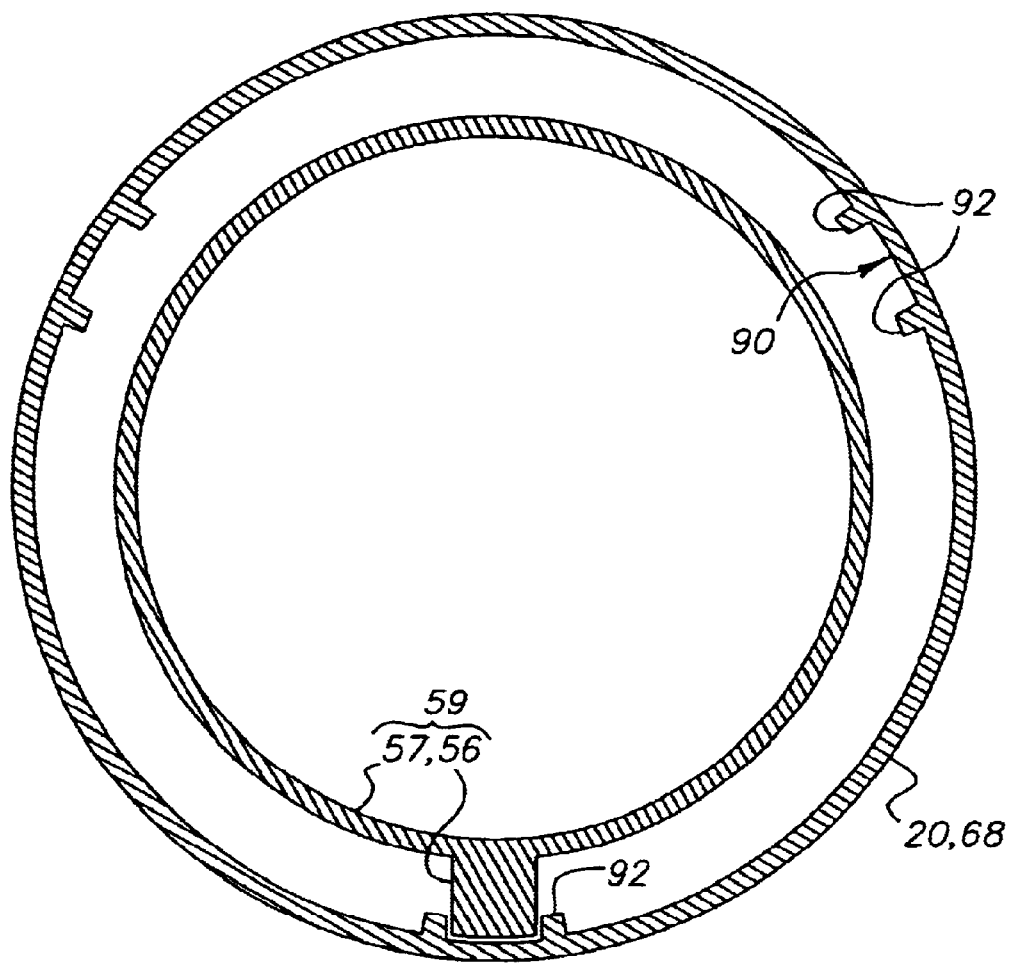
FIG. 10 is a cross-sectional view of the camera of FIG. 2 taken substantially along line 10—10 of FIG. 16. For clarity, the features of the lens barrel are simplified. The input part is in the primary orientation. This figure is not at the same scale as FIGS. 8 and 9.
Figure 11:
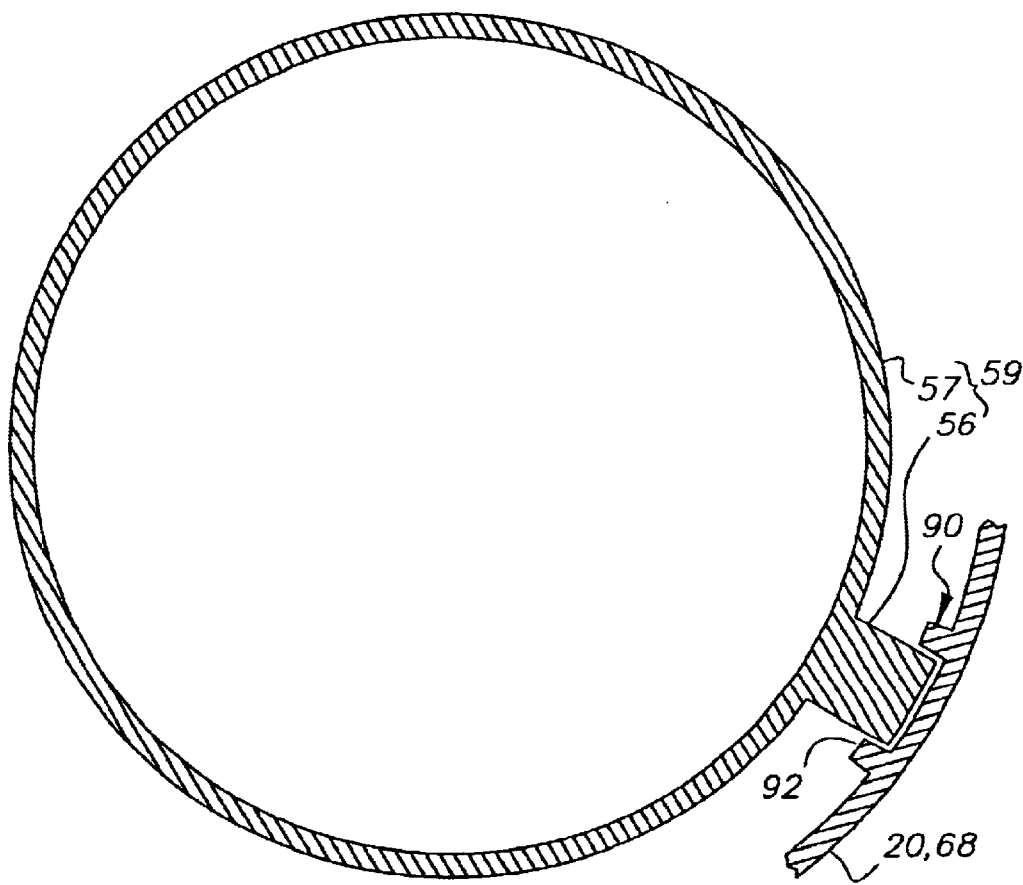
FIG. 11 is the same view as FIG. 10, but only the input part and a portion of the cowl are shown. The input part is in the secondary orientation.
Figure 12:
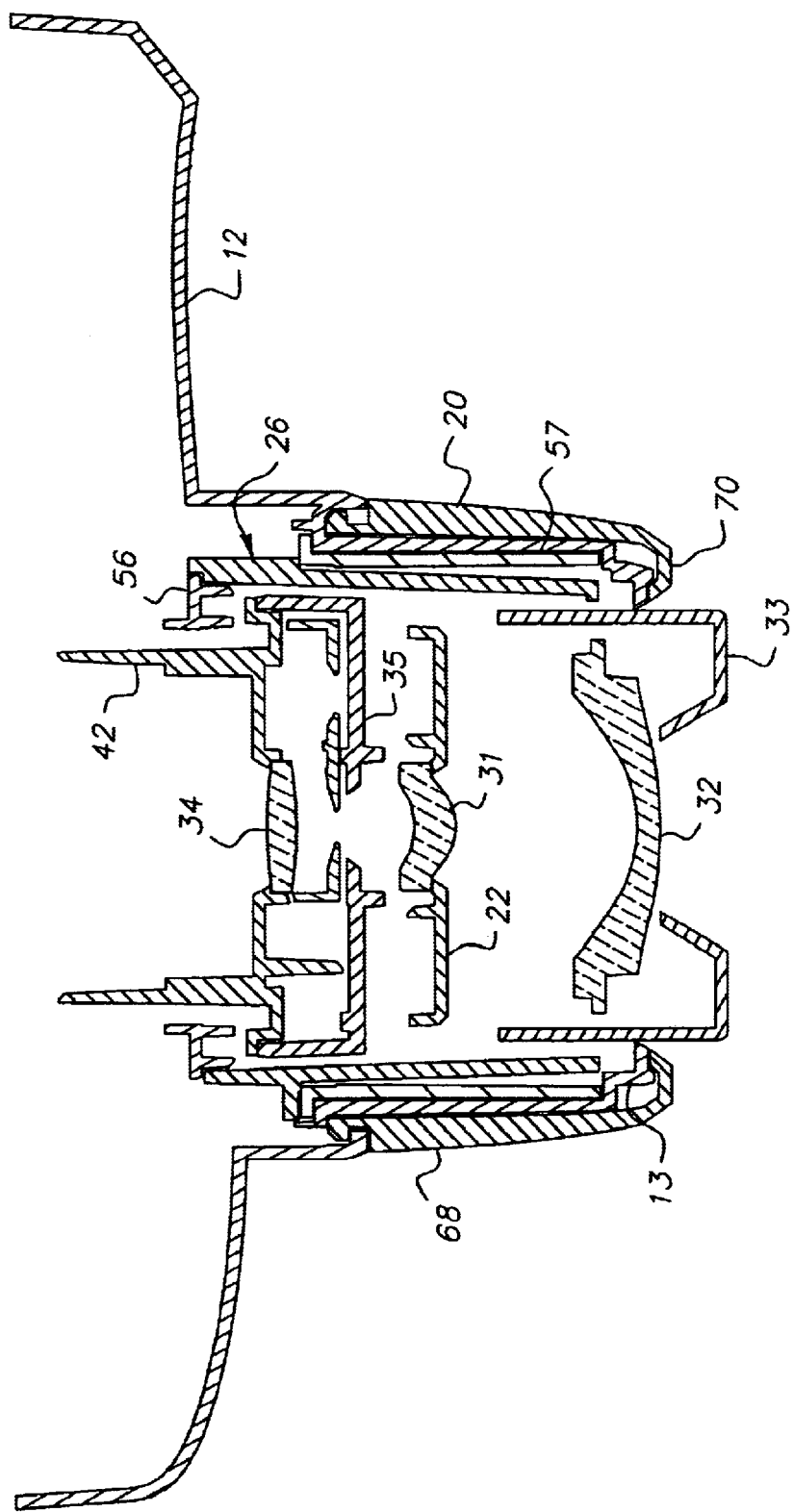
FIG. 12 is a cross-sectional view corresponding to FIG. 6, of a modification of the camera. For clarity, only the front cover, cowl, and barrel are shown. The barrel is in the extended position.
Figure 13:
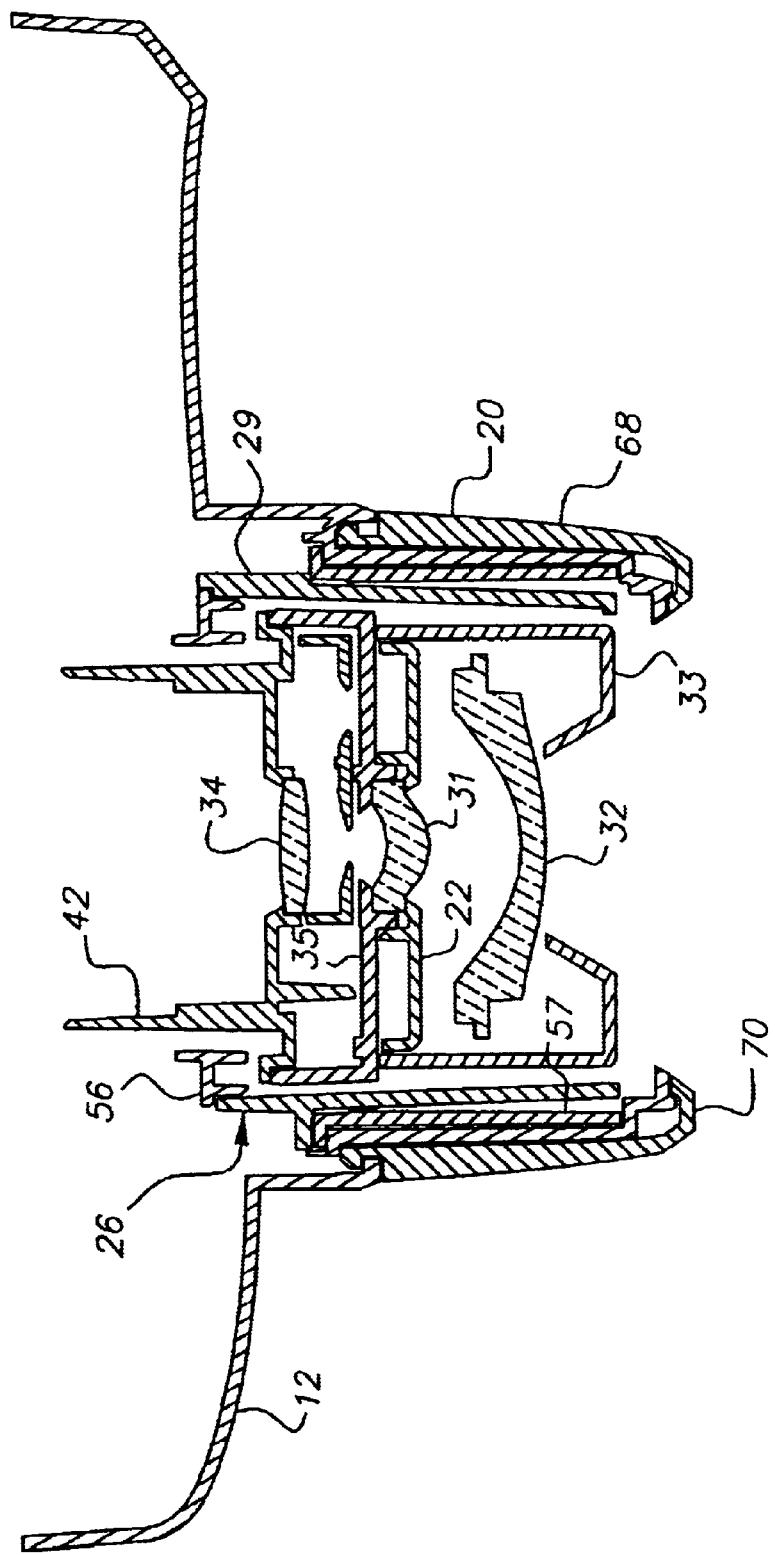
FIG. 13 is the same view as FIG. 12, but the barrel is shown in the retracted position.
Figure 14:
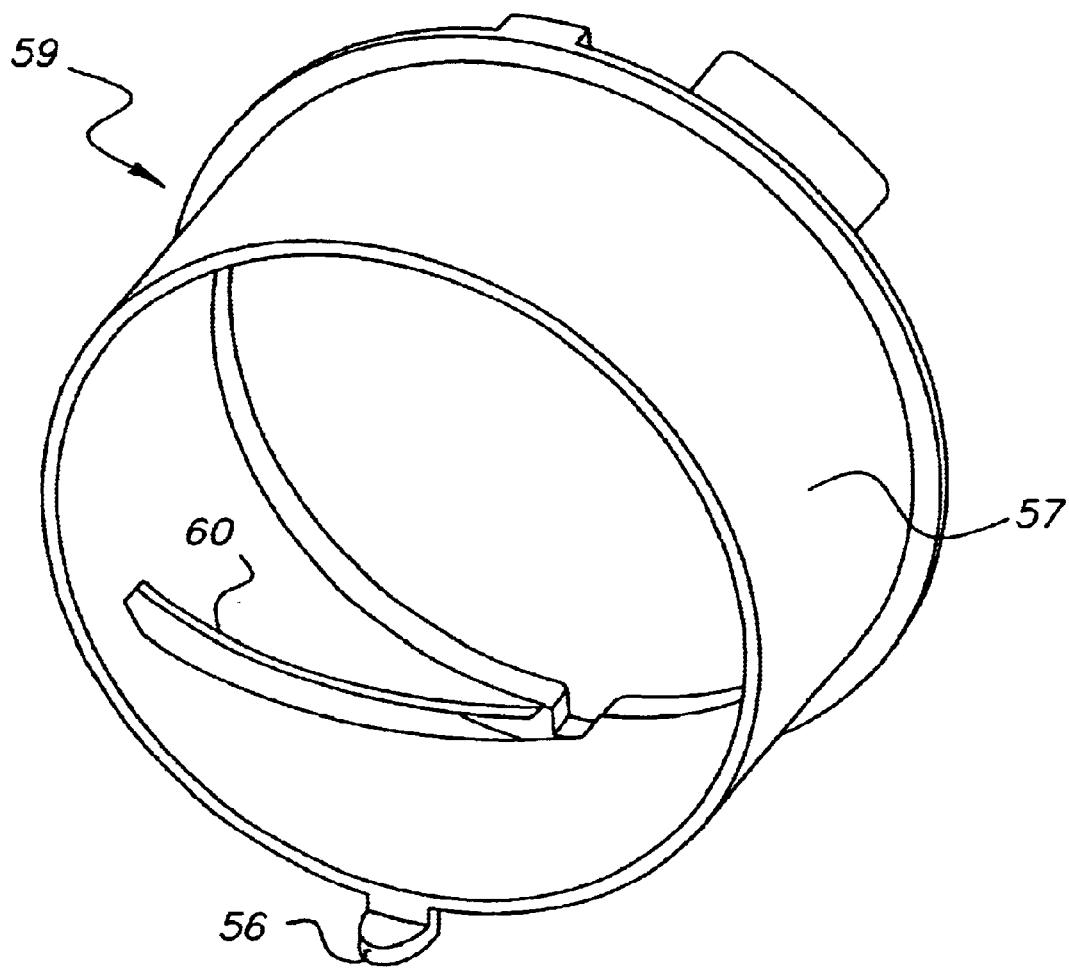
FIG. 14 is a front perspective view of the twist ring of the cameras of FIGS. 2 and 12.
Figure 15:
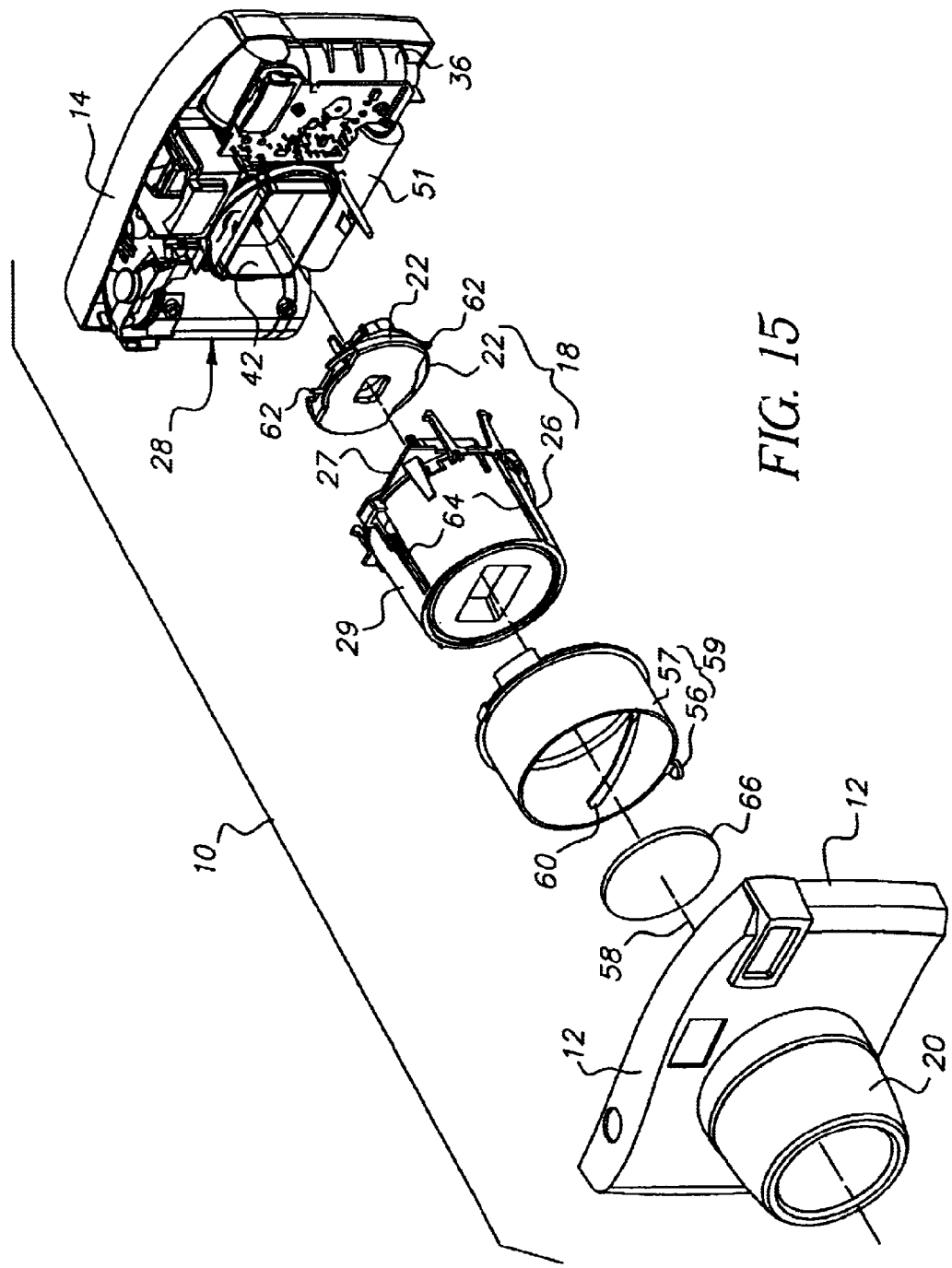
FIG. 15 is an exploded view of the camera of FIG. 2.
Figure 16:
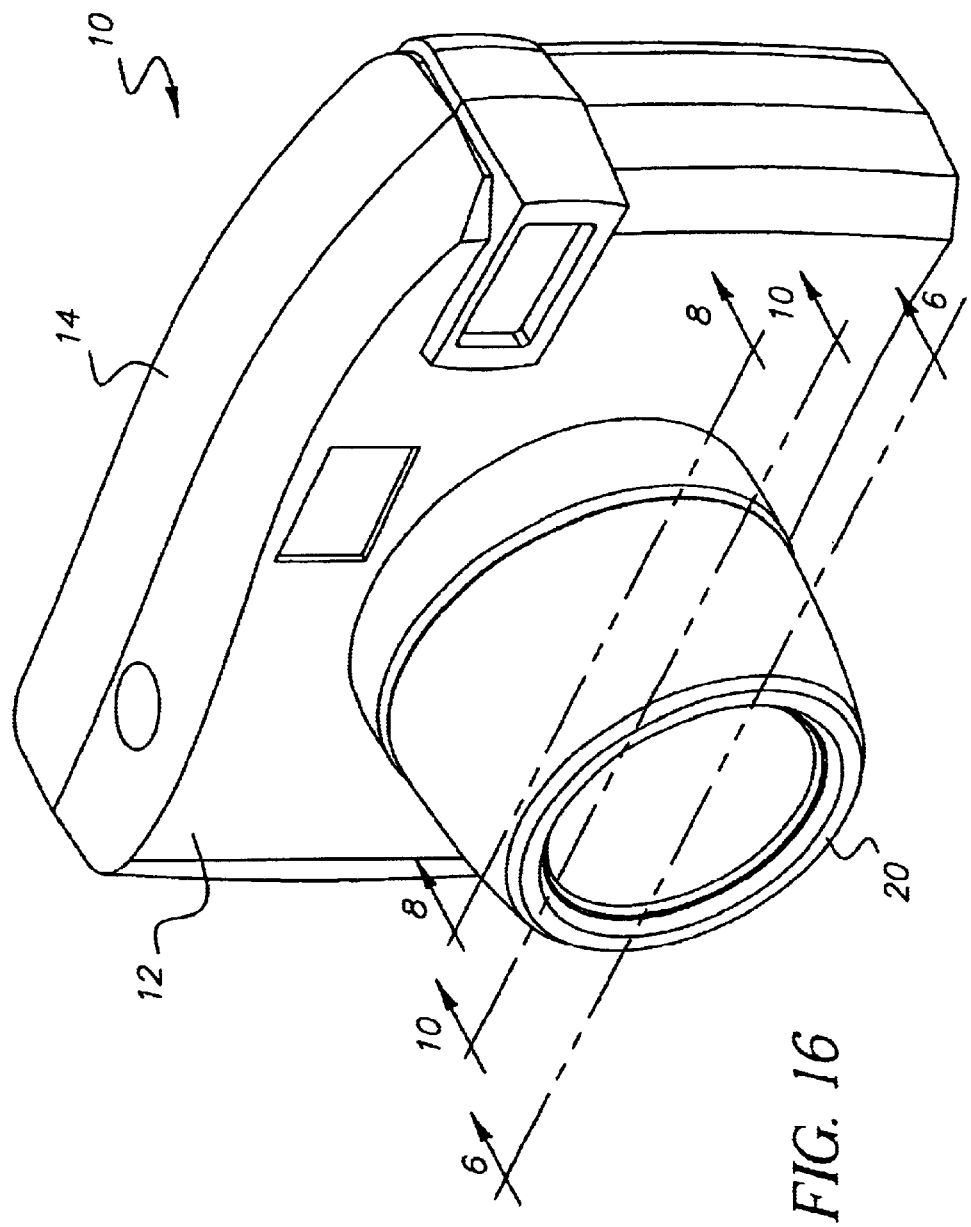
FIG. 16 is a perspective view that shows the external appearance of the camera of FIG. 2 and the camera of FIG. 6.

The barrel 22 supports one or more sets of lens elements. Each set can have one or more lens elements. The term "barrel" is indicative of the function of moving those lens elements. The axial length of the barrel differs in different lens modules. In the camera of FIG. 6, the barrel is relatively short and is moved to vary the position of a first set of lens elements 31 relative to another set 32 that, in this embodiment, is fixed (immobile) relative to the holder 26. The holder 26 has a cup 33 that extends around the front edges of the front lens element 32 and a shoe 35 that is mounted between the cup 33 and the baffle 42. In the retracted position shown in FIG. 7, the barrel rests against the shoe 35. In the camera of FIG. 12, the barrel is longer and is moved to vary the positions of two sets of lens elements 31,32 relative to the holder and a third lens element set 34. In this case, the cup 33 is part of the barrel. The shoe 35 remains fixed in position. The shutters are not shown, but can be positioned where convenient, such as adjoining the rearmost lens element. In the cameras of both FIGS. 6 and 12, the cover 12 has a annular nose 13 that extends forward and supports the cowl 20.

The lens module 18 has an input part 56 that is moved to change the focal length of the lens module 18. The input part 56 can be a portion of a rotatable barrel 22 or can be all or a portion of a separate component that moves the barrel 22 directly or indirectly. In the embodiment of FIG. 1, the camera has a twist ring 59 that includes the input part 56 and a band 57 that encircles the guide 29. The input part 56 is a tab that is joined in fixed (immobile) relation to and extends axially outward from the band 57 of a twist ring 59. For simplicity and low cost, the twist ring 59 can be provided as a one-piece plastic casting.

The twist ring 59 rotates about the optical axis 58 when the barrel 22 is telescoped. The band 57 has three spiraled cam slots 60. The barrel 22 has three outwardly extending cam followers 62. Each cam follower 62 is received by a respective cam slot 60. The guide 29 has linear slots 64 through which respective cam followers 62 extend and along which the cam followers 62 travel during telescoping. The guide 29 also has a cutout 65 through which the input part 56 is moved during assembly. The barrel 22 of the embodiment of FIG. 6 can be moved in the same manner. The embodiment of FIG. 12 requires a more complex mechanism capable of differential movement of different lens sets. Suitable mechanisms for such movement are well known to those of skill in the art. Features which provide for movement of the barrel 22 relative to the holder 26, can be varied in a manner well known to those of skill in the art. For simplicity and low cost, it is preferred that the input part 56 transfers force to the barrel 22, resulting in the movement of the barrel 22; rather than the input part 56 being a switch that actuates a motor, which moves the barrel 22.

The input part 56 is movable in two opposed directions of rotation within a range of orientations relative to the holder 26 and the cover 12. The input part 56 has first and second stop orientations at each end of the range of possible input part orientations, which correspond to retracted and extended positions of the barrel 22, respectively.

The cowl 20 has a roughly cylindrical or cup shape and has an opening at each end. The cowl 20 is rotated to telescope the barrel 22. The cowl 20 can also holds a coverglass 66 that protects the lens module 18. The coverglass 66 rotates with the cowl 20 relative to the holder 26.

The cowl 20 has a circumferential wall 68 that encircles the optical axis 58 and a forward rim 70 that is joined to the circumferential wall 68 at the front end of the cowl 20. The rear of the cowl 20, adjacent the base 24, is open. The forward rim 70 extends radially inward from the circumferential wall 68 toward the optical axis 58. In the illustrated embodiments, the forward rim 70 grips a forward margin 72 of the holder 26 of the lens module 18. This helps prevent flexing of the cowl during use.

Referring now to FIGS. 3–4 and 8–11, the cowl 20 and cover 12 have reciprocally positioned tabs 74 and shelves 76, in a manner similar to the arrangement of claws and slots of a conventional camera lens bayonet mount. In the illustrated embodiments, the cover 12 has a set of evenly spaced apart, uniformly shaped tabs 74, and the cowl 20 has a set of evenly spaced apart, uniformly shaped shelves 76. The number of tabs 74 and shelves 76 is preferably the same, but differing numbers of tabs 74 and shelves 76 can be used. Three is a convenient number for tabs 74 and for shelves 76. Numbers less than three presents a risk of cowl 20 wobble during use, unless other measures are taken to help retain the cowl 20. Numbers greater than three add complexity, but little benefit.

One of the cowl 20 and cover 12 has the tabs 74 and the other has the shelves 76. Alternatively, tabs 74 and shelves 76 can be present on both, in reciprocally arranged pairs. Each of the tabs 74 can have the same shape or different tabs 74 can have different shapes and the same is true of the shelves 76. Shapes and positions of the tabs 74 and shelves 76 are subject to the limitation that the tabs 74 and shelves 76 must be capable of engagement and disengagement.

For convenience, the following discussion will generally refer to the illustrated embodiments, in which the cowl 20 includes the shelves 76 and the cover 12 includes the tabs 74. Like considerations apply to other embodiments.

The cowl 20 is pivotable about the optical axis 58, relative to the cover 12. During pivoting, through a first range of orientations, the shelves 76 slide against respective tabs 74. In a second range of orientations, the shelves 76 and tabs 74 are disengaged. In this second range, the cowl 20 is freely removable from the cover 12 in an axially outward direction. In the first range of orientations, interference between the shelves 76 and respective tabs 74 blocks the removal of the cowl 20 from the cover 12. The angular dimensions of shelves 76 and tabs 74 relative to the optical axis 58 can be varied to change the angular dimensions of the first and second ranges of orientations, within practical limits determined by the strength of materials and a desired number of shelves 76 and tabs 74. In the illustrated embodiments, the tabs 74 collectively subtend a smaller angle than any one of the shelves 76.

The first and second ranges of orientations refer to pivoting of the cowl 20 relative to the cover 12 and, if applicable, relative to other parts that are attached to the cover 12. In some embodiments, the cowl 20 can be assembled with the cover 12 in two, three, or more different arrangements, depending upon which tab 74 is initially aligned with which shelf 76. With uniformly shaped and sized tabs 74 and shelves 76, the first and second ranges remain the same no matter how the cowl 20 is assembled on the cover 12. This is currently preferred, because the cowl 20 can be assembled on the cover 12 in any way that the two fit together. On the other hand, tabs 74 and shelves 76 can be configured so as to provide different first and second ranges depending upon how the cowl 20 and cover 12 are assembled. This might be required to use the same cover 12 and cowl 20 with different lens modulees requiring different extents of cowl 20 rotation.

Figure 3:
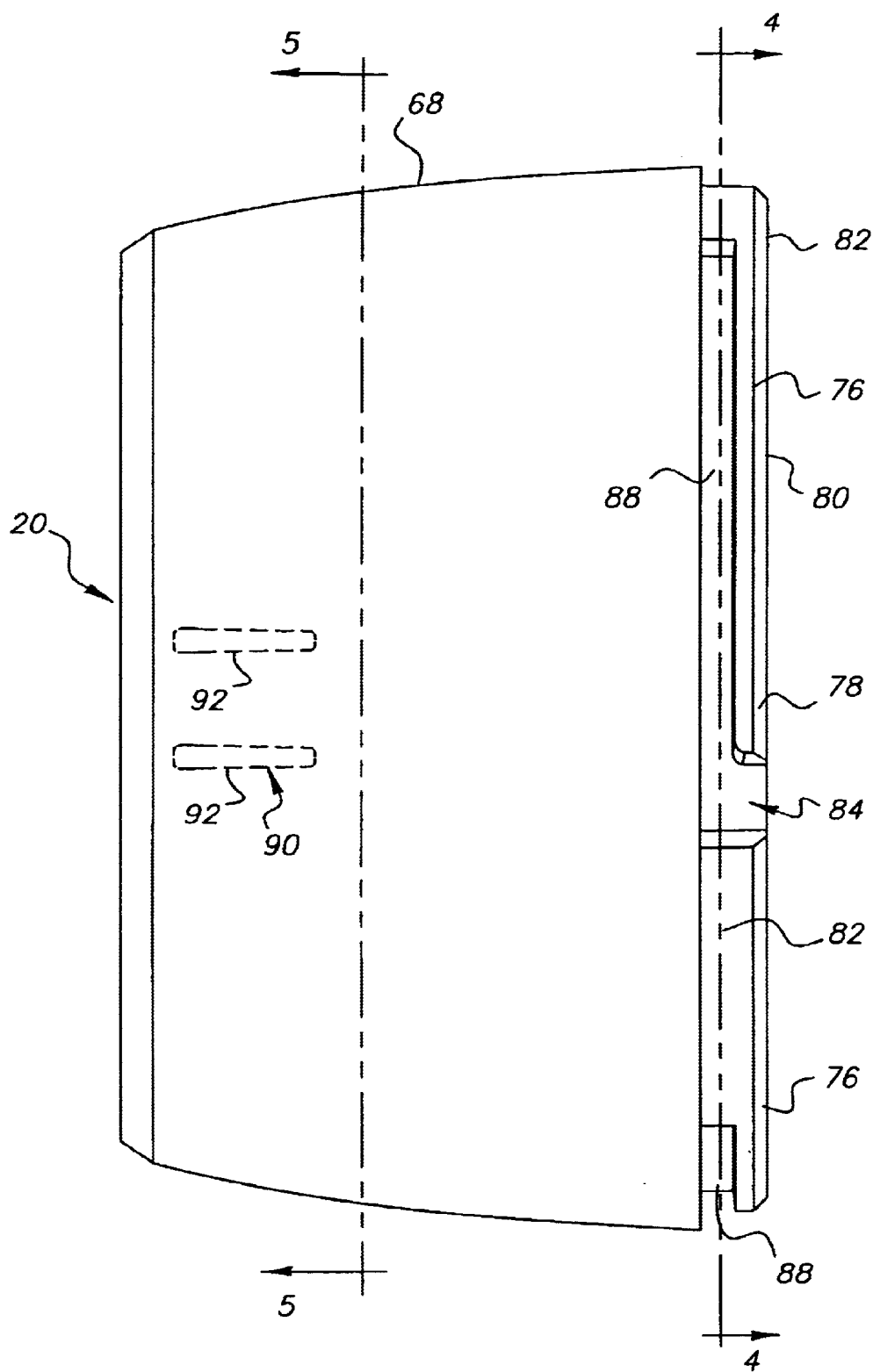
FIG. 3 is a side view of the cowl of the camera of FIG. 2. The position of one of the channels is indicated by dashed lines.
Figure 4:
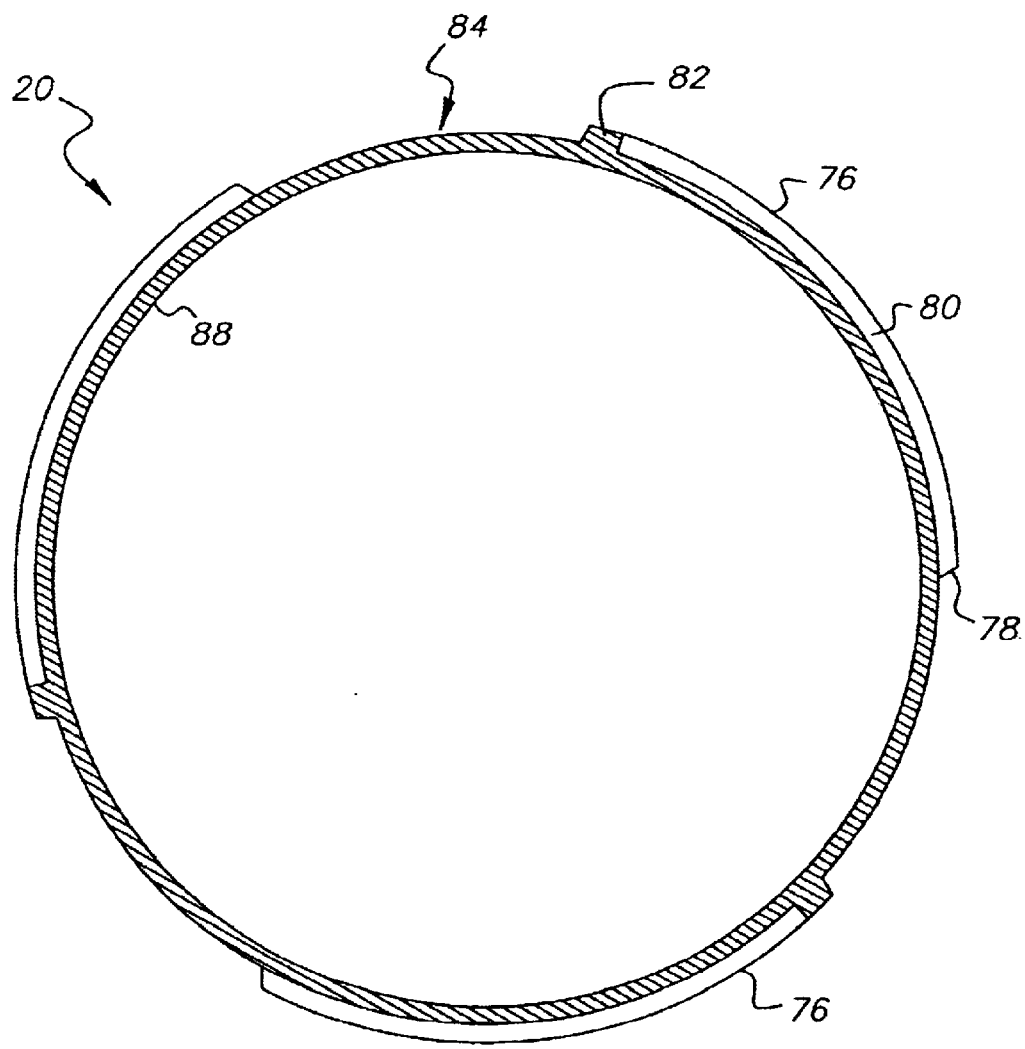
FIG. 4 is a cross-sectional view of the cowl of FIG. 3 taken substantially along line 4—4 of FIG. 3.

Referring now to FIGS. 3–4, the shelves 76 are located at the rear end of the cowl 20. Each shelf 76 has an open end 78, a middle 80, and a closed end 82. The open end 78 of one shelf 76 is separated from the closed end 82 of the next shelf 76 by an interspace 84, in which no shelf 76 or other radial protrusion is present.

In the illustrated embodiments, the tabs 74 and shelves 76 are equally spaced around the cowl 20 and lens opening 16. The tabs 74 and shelves 76 are uniform in shape and the cowl 20 can be positioned, such that any of the shelves 76 can be aligned against a particular tab 74. Unequal spacings or tabs 74 and shelves 76 of non-uniform shapes can be used to limit the cowl 20 to a single arrangement, such that each shelf 76 can only be aligned with a unique tab 74.

The shelves 76 are separated from the circumferential wall 68 of the cowl 20, in a direction parallel to the optical axis 58, except at the closed ends 82. The separation is sufficient to allow admission of the respective tabs 74 and movement of the tabs 74 along respective shelves 76 to the closed ends 82. Further rotation in the same direction is blocked by the closed ends 82. In the illustrated embodiments, a radially recessed extension 88 of the circumferential wall 68 of the cowl 20 is located radially inward from the shelves 76 and supports the shelves 76 at the open ends 78 and middles 80. The tabs 74 of the cover 12 extend radially inward beyond respective shelves 76, to the extension 88. The tabs 74 can contact the extension 88, which increases friction between the cowl 20 and the cover 12, or can be spaced from the extension 88. The extension 88 can also be eliminated. In this case, the radial length of the tabs 74 can be increased or, alternatively, the tabs 74 can be provided in the form of necks (not shown) between slots in the cover 12. Like considerations apply to embodiments in which the shelves 76 are on the cover 12, rather than the cowl 20.

The input part 56 is engaged by the cowl 20 in the assembled camera 10. The shape of the input part 56 is otherwise not critical, other than as necessary for a particular lens mechanism and as necessary so as to engage the holder 26. The engagement of the the input part 56 and holder 26 can be provided in a variety of ways, such as a friction fit of the input part 56 and cowl 20 against each other. In some embodiments, such as those illustrated, the input part 56 and cowl 20 are loosely fit together or have a close fit that is limited to small portions of the two components. This is advantageous if one-piece plastic castings are used for the cover 12 and cowl 20, since tolerances can be eased. Such plastic castings are advantageous for one-time-use cameras and other inexpensive cameras.

Figure 5:
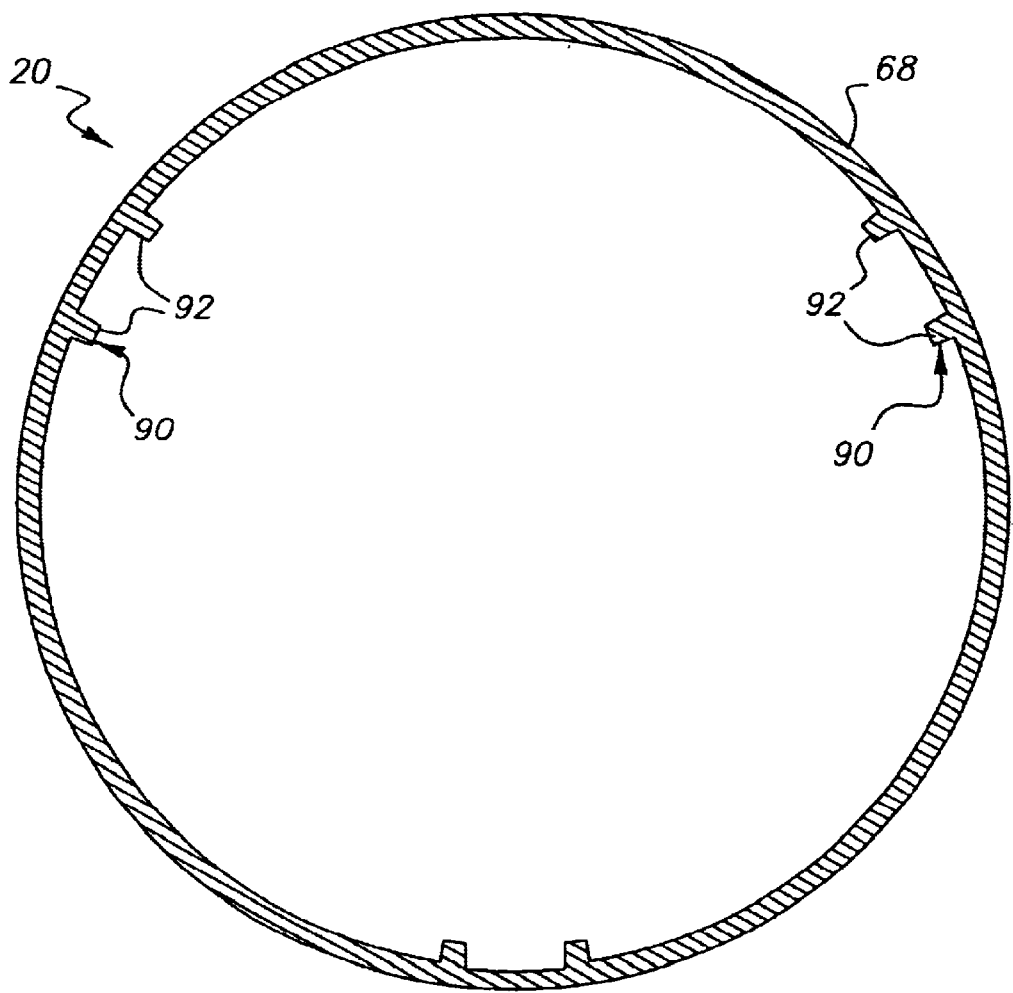
FIG. 5 is a cross-sectional view of the cowl of FIG. 3 taken substantially along line 5—5 of FIG. 3.

In the illustrated embodiments, the cowl 20 has a channel 90 that receives the input part 56. As an alternative, a protrusion can be provided on the cowl 20 and the input part can be shaped like a channel. Multiple channels can be provided, as shown in FIG. 5, to accommodate different placements of the cowl 20 on the cover 12. Multiple input parts could, likewise, be provided. For convenience, the following is directed to the illustrated embodiments, in which multiple channels 90 are provided on the cowl 20 and a single input part 56 is provided. Like considerations apply to other embodiments.

The channels 90 are spaced apart from the shelves 76 in a direction parallel to the optical axis 58. This spacing can be varied to meet the requirements of particular lens modulees and covers. The channels 90 each have a pair of opposed walls 92 that extend in directions radial to and parallel to the optical axis 58. The channels 90 are each aligned with a respective shelf 76. This alignment is such that, when a channel 90 and input part 56 are engaged, the range of possible orientations of the input part 56 is the same as or within the first range of orientations of the cowl 20 relative to the cover 12.

During assembly of the camera 10, the cowl 20 is placed on the cover 12, in an orientation within the second range. The tabs 74 and shelves 76 are disengaged and the cowl 20 is freely removable. The cowl 20 is then rotated relative to the cover 12, until the cowl 20 is at an orientation in the first range. (A convenient orientation is an end orientation, at which one or more of the tabs 74 contact the closed end or ends 82 of respective shelves 76.) The cover 12 is then attached to the base 24. After that attachment, the cowl 20 can pivot only pivot between a primary orientation and a secondary orientation of the input part 56 relative to the holder 26 and cover 12. The input part 56 blocks rotation of the cowl 20 into an overtravel orientation within the second range of orientations. Rotation in the other direction is limited by the closed ends 82 of the shelves 76 or by a limitation in the range of rotation of the input part 56, whichever is less. During use, the cowl 20 is manually pivoted between primary and secondary orientations by the user to telescope the lens module 18.

The invention has been described in detail with particular reference to certain preferred embodiments thereof, but it will be understood that variations and modifications can be effected within the spirit and scope of the invention.

What is claimed is:

1. A cowl assembly comprising:
   a base;
   a twist ring mounted to said base, said twist ring defining an axis, said twist ring being rotatable relative to said base about said axis, between a primary orientation and a secondary orientation;
   a cover removably attached to said base;
   a cowl coupled to said cover, said cowl engaging said twist ring, said cowl being pivotable with said twist ring between said primary and secondary orientations, said twist ring blocking said cowl from pivoting beyond said primary and secondary orientations to a overtravel orientation, wherein said cowl is freely removable from said cover.

2. The cowl assembly of claim 1 wherein said twist ring is internal to said cowl.

3. The cowl assembly of claim 1 further comprising a coverglass held by and rotatable with said cowl.

4. The cowl assembly of claim 1 wherein said base further comprises a camera frame and a holder joined to said camera frame.

5. The cowl assembly of claim 1 further comprising a lens barrel engaging said twist ring, said lens barrel being disposed in an extended position relative to said base when said twist ring is in said primary orientation, said lens barrel being disposed in a retracted orientation relative to said base when said twist ring is in said secondary orientation.

6. The cowl assembly of claim 1 wherein said cover and said cowl are each a one-piece plastic casting.

7. A cowl assembly comprising:
   a base;
   a lens barrel mounted to said base, said barrel being rotatable relative to said base through a first range of orientations;
   a cover attached to said base, said cover having an opening aligned with said barrel, said cover being releaseable to separate said cover from said base;
   a cowl encircling said opening, said cowl being manually pivotable about said optical axis with said lens barrel, only within said first range of orientations, when said cover is attached to said base, said cowl being manually pivotable about said optical axis, relative to said base, into a second range of orientations beyond said first range, when said cover is separated from said base, said cowl being retained by said cover in said first range of orientations, said cowl being freely removable from said cover in said second range of orientations.

8. The cowl assembly of claim 7 wherein one of said cowl and said cover has a plurality of tabs, the other of said cowl and said cover has a plurality of shelves, and said tabs each overlap against a respective one of said shelves when said lens barrel and said cowl are in said first and second orientations.

9. A cowl assembly comprising:
   a base defining an optical axis;
   a lens module joined to said base, said lens module having an input part rotating about said optical axis, relative to said base, through a first range of orientations, said lens module having a barrel moving along said optical axis between extended and retracted positions responsive to said rotating of said input part;
   a cover removably attached to said base;
   a cowl encircling said optical axis, said cowl being pivotable through said first range of orientations with said input part, said cowl being blocked by said input part from pivoting, relative to said base, into a second range of orientations beyond said first range, said cowl being slidably engaged by said cover in said first range of orientations, said cowl being disengaged from said cover in said second range of orientations.

10. The cowl assembly of claim 9 wherein said cowl and said cover have one or more tabs and one or more shelves, said tabs each overlapping against a respective one of said shelves when said lens barrel and said cowl are in said first range of orientations.

11. The cowl assembly of claim 10 wherein said pivoting of said cowl blocked by said input part is in a first direction of rotation about said optical axis; and said shelves each have a closed end and an open end, said closed ends blocking pivoting of said cowl, in a second direction of rotation about said optical axis, beyond said first range of orientations into said second range of orientations, said second direction of rotation being opposite said first direction of rotation.

12. The cowl assembly of claim 10 wherein said tabs subtend a lesser angular dimension relative to said optical axis, than each of said shelves.

13. The cowl assembly of claim 10 wherein said cover has said tabs and said cowl has said shelves.

14. The cowl assembly of claim 10 wherein said tabs and said shelves are disengaged in said second range of orientations.

15. The cowl assembly of claim 9 wherein said cowl has a circumferential wall and a forward rim joined to said circumferential wall, said forward rim being disposed opposite said base, said forward rim extending radially inward from said circumferential wall toward said optical axis.

16. The cowl assembly of claim 15 wherein said barrel is disposed interior to said forward rim in said extended and retracted positions.

17. The cowl assembly of claim 9 wherein said barrel extends axially outward relative to said forward rim in said extended position.

18. The cowl assembly of claim 9 wherein said cover and said cowl are each a one-piece plastic casting.

19. The cowl assembly of claim 9 wherein said base further comprises are camera frame and a holder joined to said camera frame.

20. The cowl assembly of claim 19 wherein said lens module has a band disposed encircling said holder, said band being internal to said cowl, said input part protruding radially outward from said band.

* * * * *